Aug. 18, 1959
B. ROBERTS
2,900,191
DICTATION APPARATUS
Filed Feb. 11, 1953
7 Sheets-Sheet 1
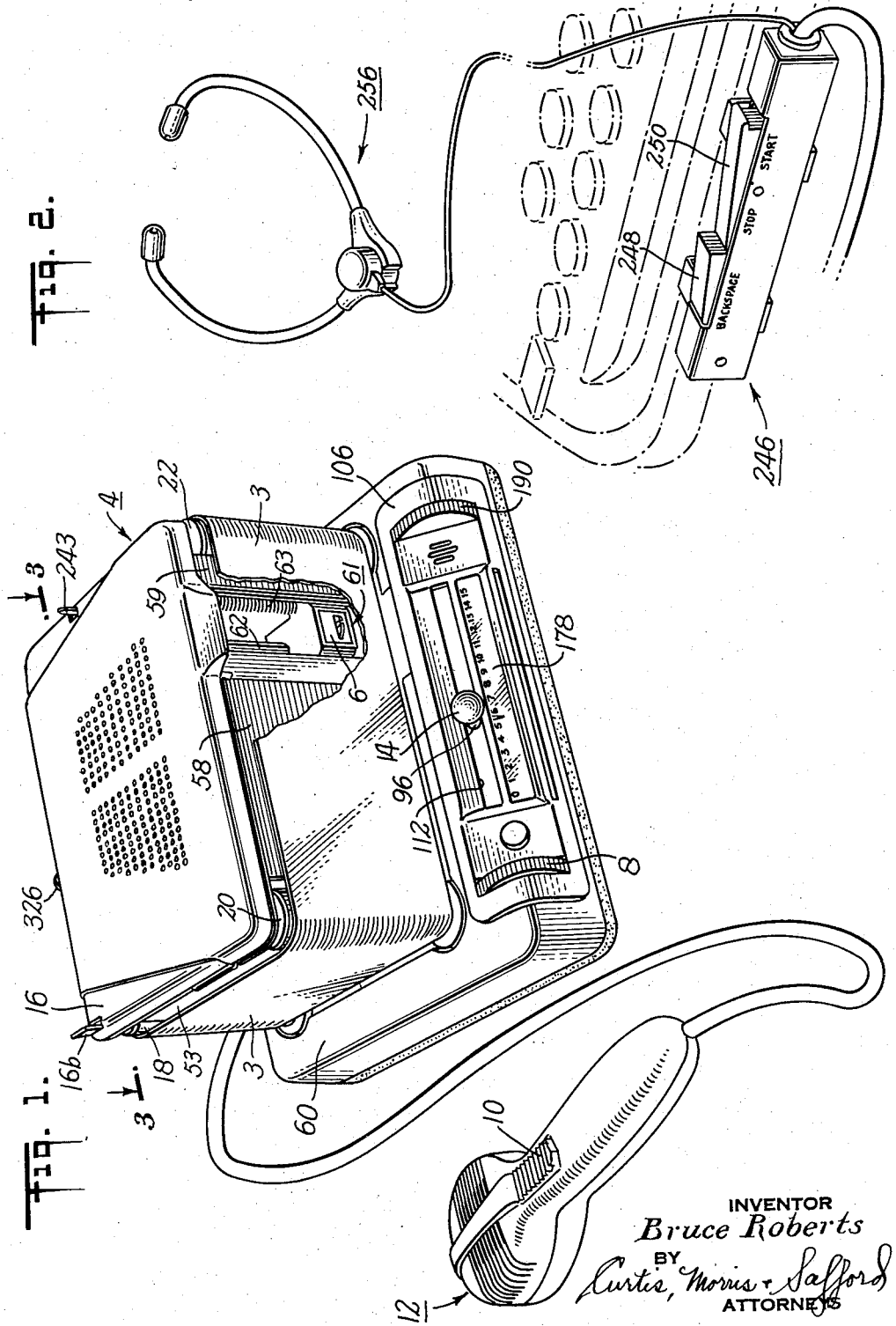
INVENTOR
Bruce Roberts
BY
Curtis, Morris + Safford
ATTORNEYS Aug. 18, 1959  B. ROBERTS  2,900,191
DICTATION APPARATUS
Filed Feb. 11, 1953  7 Sheets—Sheet 2

INVENTOR
Bruce Roberts
BY
Curtis, Morris & Safford
ATTORNEYS

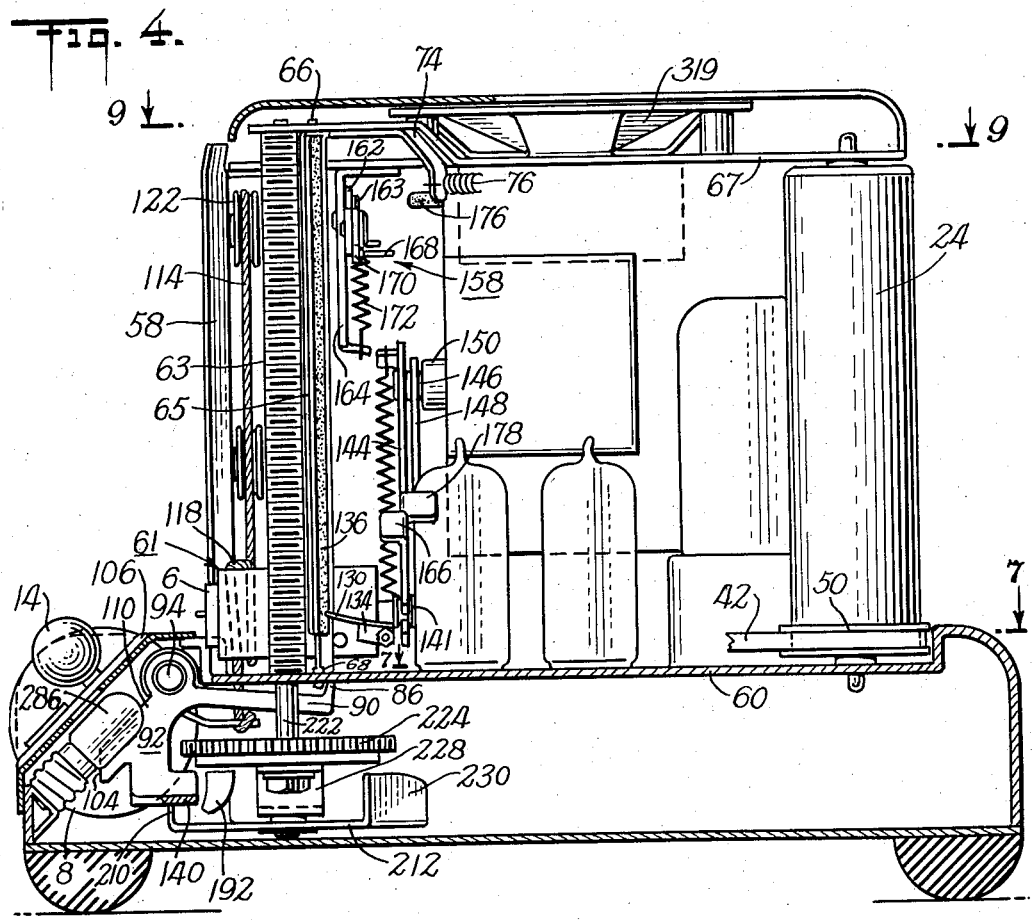
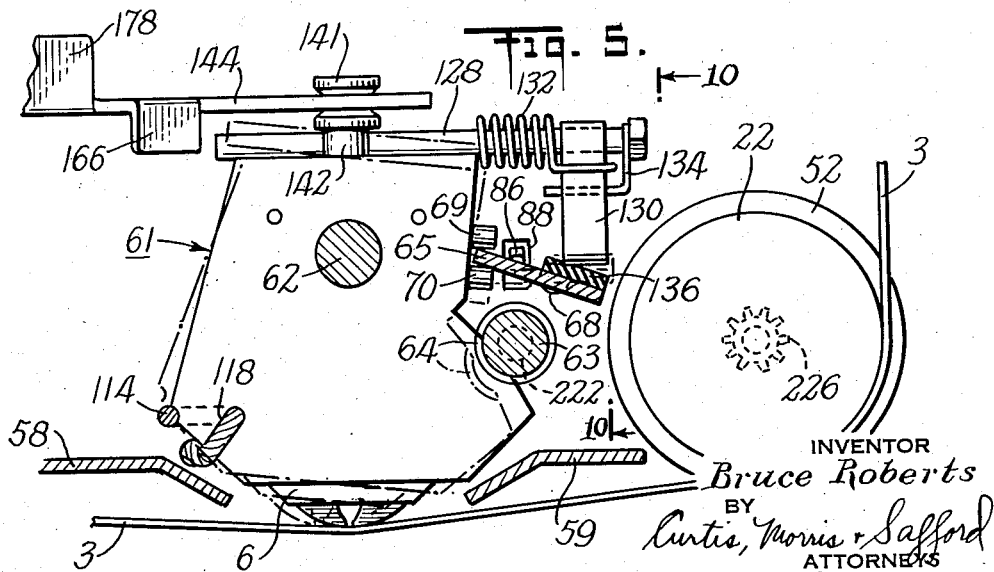

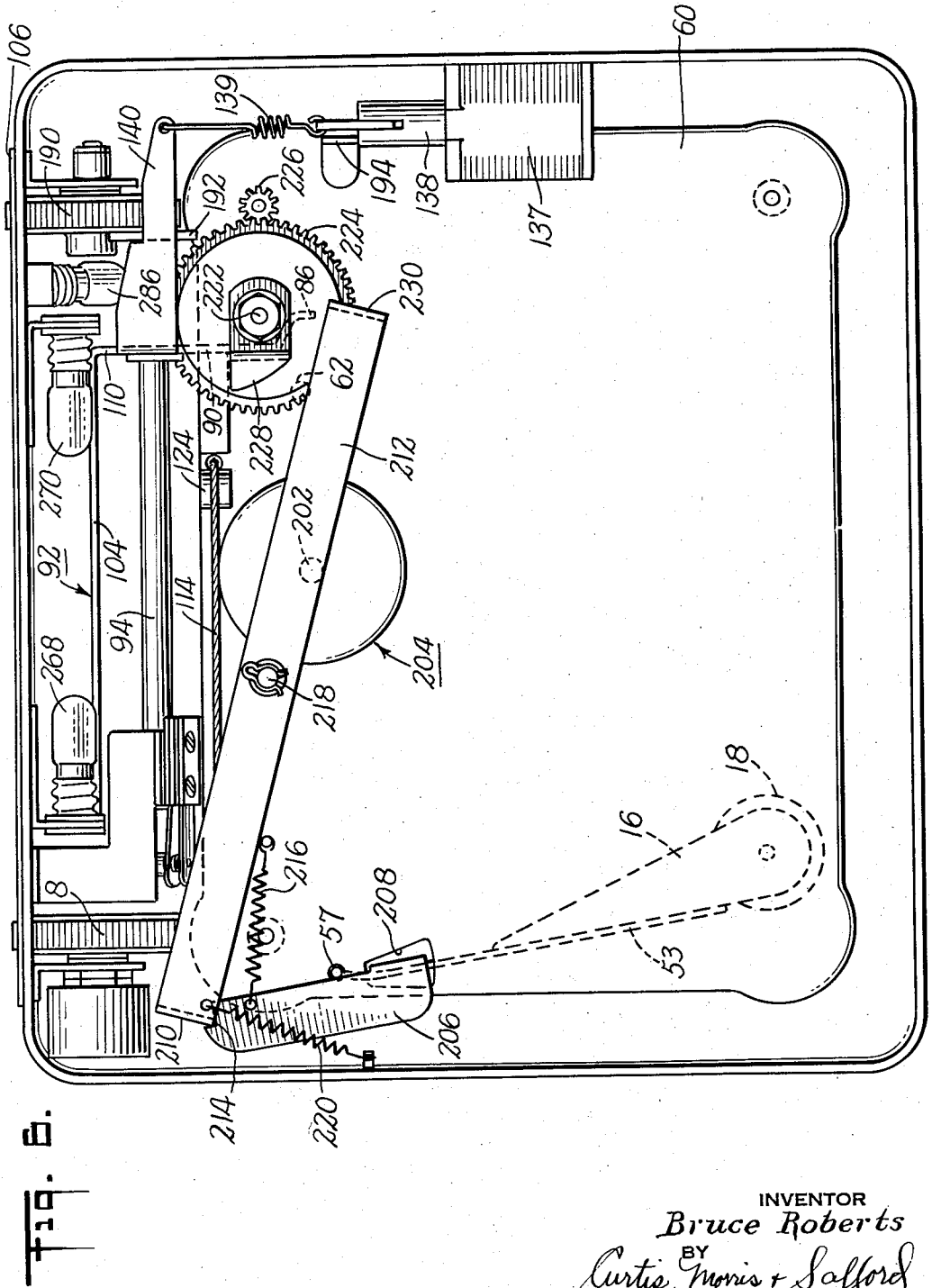

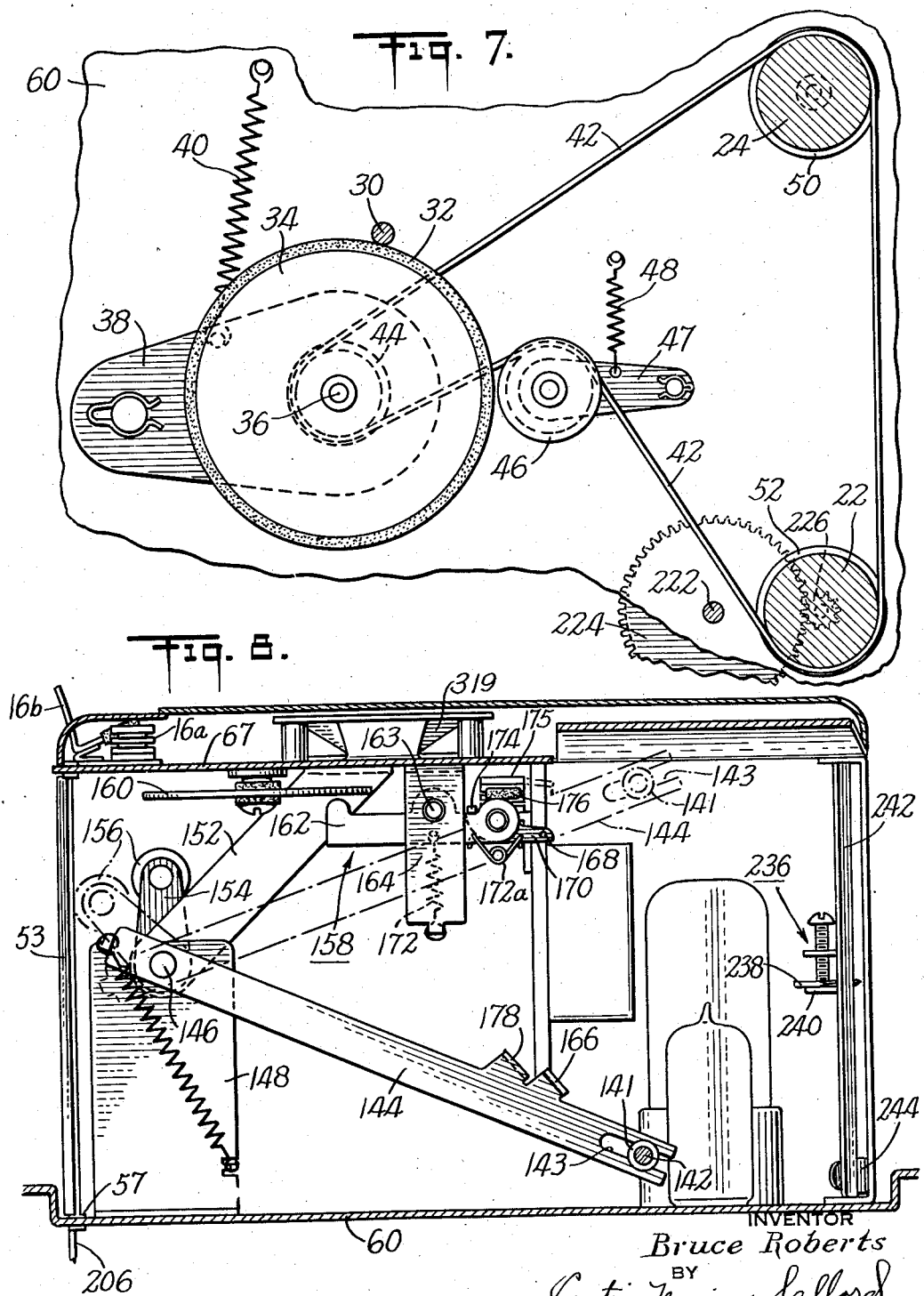

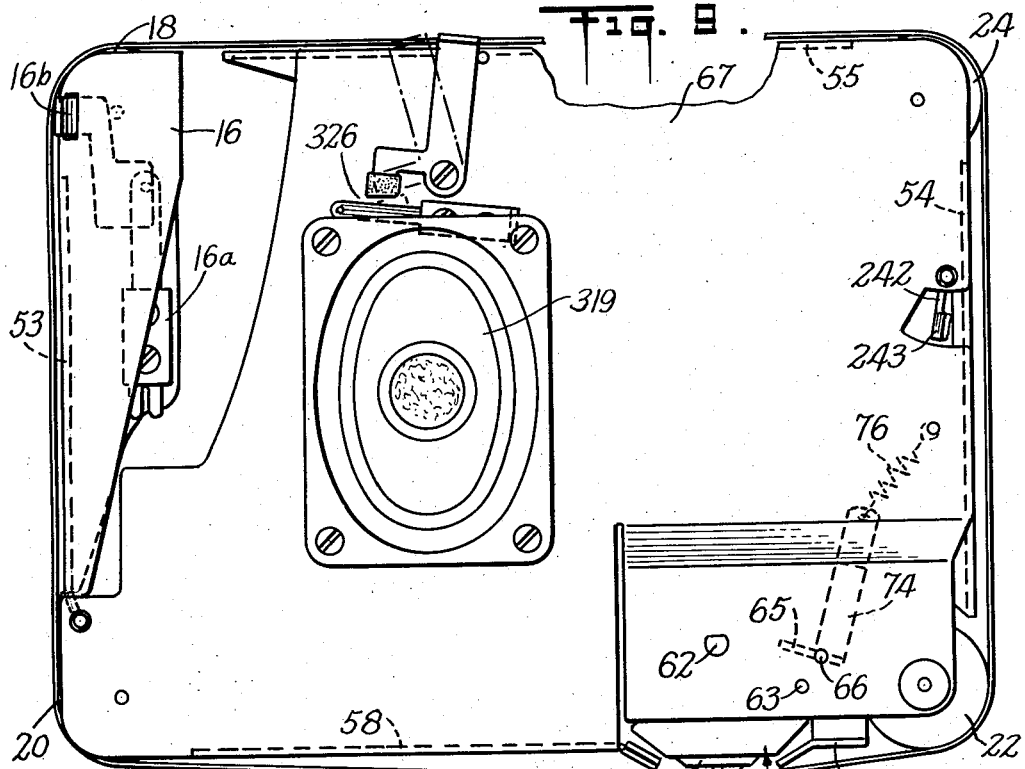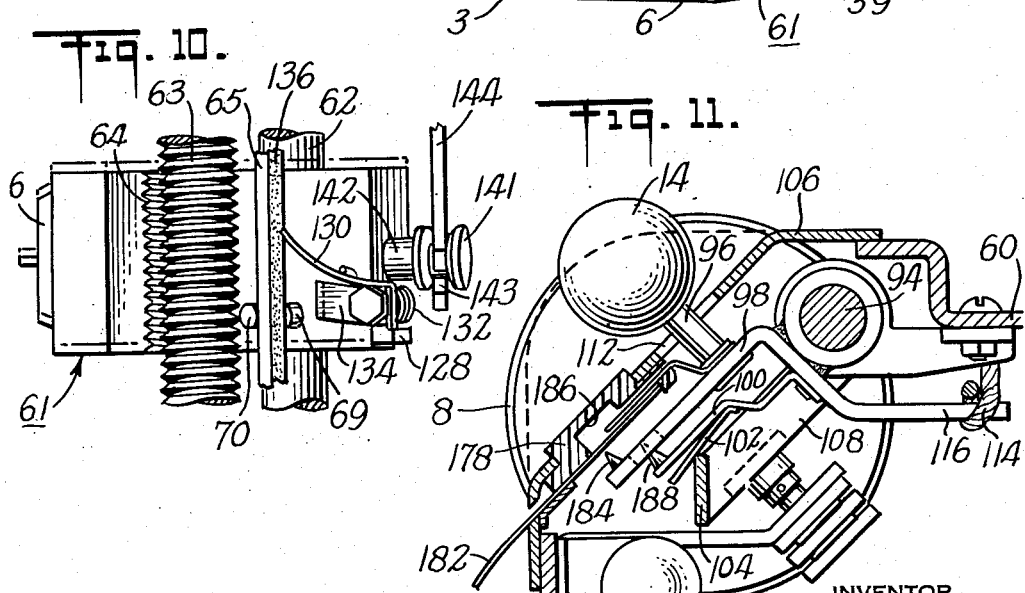

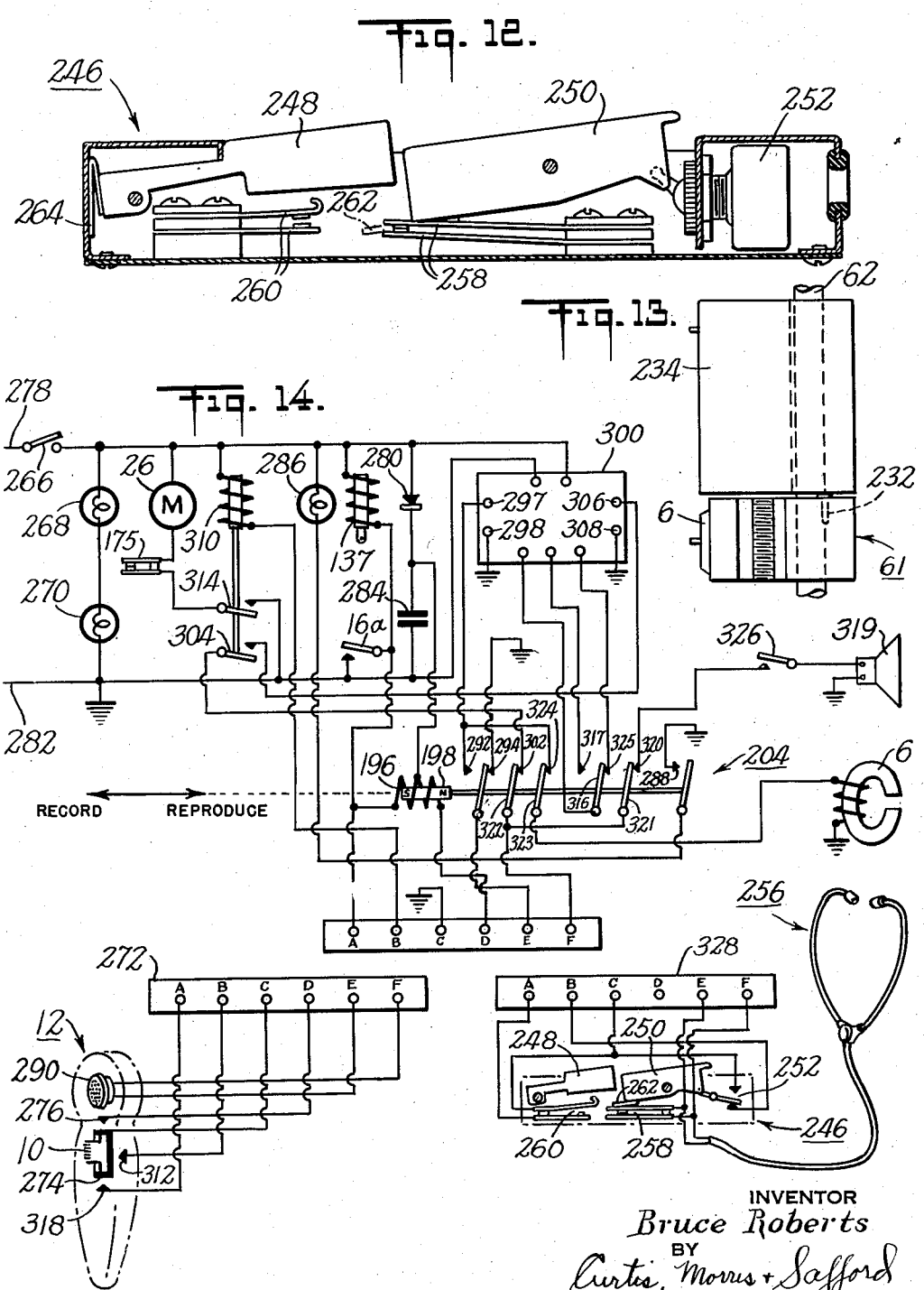

United States Patent Office 2,900,191
Patented Aug. 18, 1959

2,900,191
DICTATION APPARATUS

Bruce Roberts, Oberlin, Ohio, assignor to Dictaphone Corporation, Bridgeport, Conn., a corporation of New York Application February 11, 1953, Serial No. 336,375

7 Claims. (Cl. 274—4)

This invention relates to improved sound recording and reproducing apparatus. More particularly, it relates to an improved office-type dictating machine and to novel features and apparatus incorporated therein and useful also in machines of substantially different design.

In a preferred embodiment of the invention, a flexible belt type record is used which may be rolled or flattened without damage and so is convenient to use and store. Preferably the record is of the type on which the recording is made magnetically so that the same record can be used repeatedly.

The machine is so arranged that the belt record travels around the outside of the machine, thus permitting the use of a large record having an unusually large recording area without requiring an unduly large or bulky machine for supporting and driving the record.

Provision is made in the machine so that two spaced recording heads can be operated simultaneously so as to record the dictation on two separate portions of the record. The machine includes a conveniently-operated cutting arrangement which cuts the two portions of the record apart to form two identical belt recordings so that, for example, one can be mailed away and the other retained for transcription or record purposes.

Interlock devices and circuits are provided so that a number of control functions are provided automatically and damage to the machine by improper operation of the manual controls is prevented.

Detachable dictating and transcribing units are provided so that a common record-supporting and driving machine can be used both for dictation and transcription. The dictation unit includes a microphone and the appropriate switch controls and playback mechanism, whereas the transcription unit includes a headset and a switch control unit that can be secured to the frame of a typewriter adjacent the keyboard. These units are of the "plug-in" type and no other electrical changes are required when changing from one to the other.

The machine includes relatively simple and effective spacing, indicating, and driving mechanisms together with novel record supporting, guiding, and tensioning mechanisms the operation of which is explained fully below.

The above and other aspects, objects, and advantages of this invention will be in part apparent from and in part pointed out in the following description of a preferred embodiment of the invention, considered together with the accompanying drawings, in which:

Figure 1 is a perspective view of a dictating machine embodying the present invention;

Figure 2 is a perspective view of a transcription control unit for use with the dictating machine of Figure 1 and is illustrated in place on a typewriter and with a headset for the transcriber attached thereto;

Figure 4 is a vertical sectional view taken along the line 4—4 of Figure 3;

Figure 5 is an enlarged partial plan view of the sound recording and reproducing head and associated assembly;

Figure 6 is a bottom view of the machine with the cover plate removed;

Figure 7 is an enlarged partial view taken along the line 7—7 of Figure 4, showing details of the driving assembly;

Figure 8 is a vertical view of the turret portion of the machine taken along the line 8—8 of Figure 3;

Figure 9 is a horizontal sectional view of the top portion of the turret of the machine taken along the line 9—9 of Figure 4;

Figure 10 is a partial-elevational view of the sound recording and reproducing head assembly of Figure 5;

Figure 11 is an enlarged vertical sectional view of the front part of the base portion of the machine taken along line 11—11 of Figure 3;

Figure 12 is a vertical sectional view of the transcription control unit shown in Figure 2;

Figure 13 is a side elevational view of the main sound recording and reproducing head and an auxiliary recording head for making a simultaneous duplicate sound track shown plugged in place on top of the main head; and Figure 14 shows diagrammatically electrical circuits suitable for this machine.

General description

Figure 3:
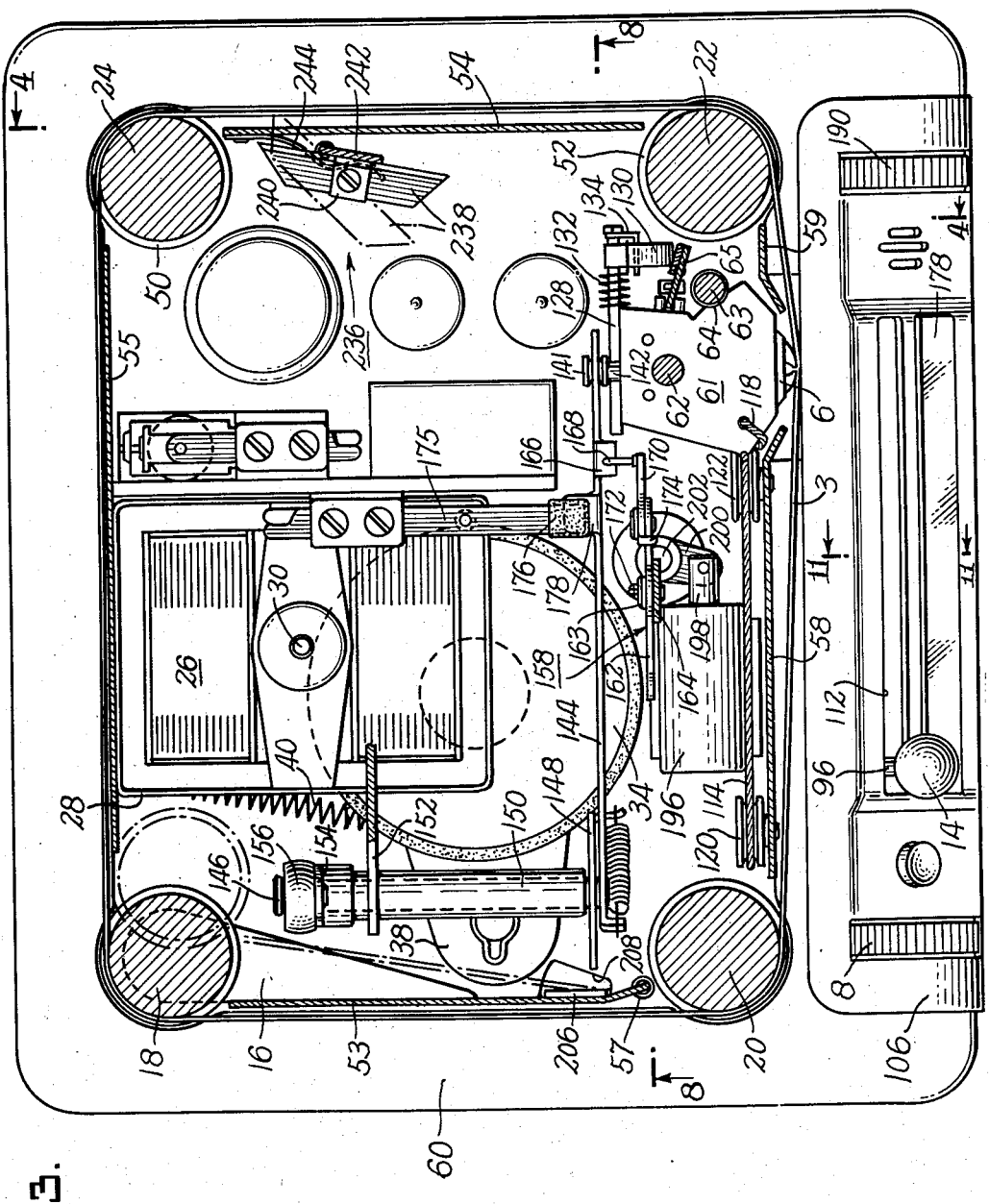
Figure 3 is an enlarged horizontal cross-sectional view, taken near the top of the turret portion of the machine shown in Figure 1 looking down into the turret.

The office dictating machine shown in Figure 1 uses an endless record belt 3 coated with a layer of magnetizable material for magnetically recording sound. This record belt travels around an upper turret portion 4 of the machine. A magnetic type recording and reproducing head 6 is arranged to move vertically in the machine and to trace a helical sound track on the inner surface of the record belt 3.

The machine is turned on by rotating a knob 8 which also controls the volume of the sound during reproduction. A thumb-operated button 10 on a hand microphone unit 12 controls the electric circuits conditioning the machine for recording or reproduction and also starts and stops the record-driving mechanism.

To condition the machine for recording, the button 10 is moved upwardly, toward the microphone end of the unit 12, and then returned to its central position. This causes an automatic record-phasing and loading control mechanism to place the belt 3 under tension and energizes the recording circuits. With the machine thus in recording condition, the operator can start the drive mechanism during dictation by pressing inwardly on the thumb button 10; when the pressure is removed from this button, the machine stops.

To listen back to matter already recorded, the control button 10 is moved downwardly; this changes the machine into reproducing condition and back-spaces the recording-reproducing head 6 a short distance so that the last-recorded material will be reproduced when the button 10 is returned to its central position and again pressed inwardly.

To reproduce a greater portion of the recorded material, the button 10 can be moved repeatedly between its operating and reproduce positions causing step-by-step backspacing of the head 6. Alternatively, the head 6 can be moved in either forward or reverse direction by depressing a carriage-control knob 14 and sliding it toward the left or right.

The usual practice is to use the automatic step-by-step backspacing control when the operator desires to listen back only to the last portion or concluding remarks of previously recorded material. When it is desired to reproduce material which was recorded further back on the record, the control knob 14 is used for backspacing.

To remove the record belt 3, a record-control lever 16 is moved toward the right, as viewed in Figure 1, releasing the tension on the belt 3 and leaving the machine in condition to receive another record.

The record-supporting and driving mechanism

The record belt 3 is supported by and travels around four rollers 18, 20, 22 and 24 (see Figure 3) positioned, respectively, at the corners of the turret 4. The rollers 22 and 24 at the right of Figure 3 provide the driving force for the record belt. The rollers 18 and 20 are idlers, the roller 18 being movable transversely to permit the tension on the belt 3 to be released so that the record can be removed and replaced.

The record is driven by an electric motor 26 mounted near the rear central part of the turret 4 and surrounded by a magnetic shield 28 of a highly permeable ferromagnetic material, such as soft iron or "Permalloy," to reduce the stray magnetic flux that might otherwise interfere with the recording.

Figure 7 shows the arrangement by which the motor drives the rollers 22 and 24. The motor drive shaft 30 drives the rubber rim 32 of a puck 34 mounted on a shaft 36 carried by a pivotally-supported arm 38. The puck 34 is maintained in frictional contact with the motor shaft 30 by a tension spring 40 connected between the arm 38 and the base of the machine.

A narrow flat driving belt 42 extends around a driving pulley 44 also secured to the shaft 36, around a tensioning idler 46, mounted on a pivoted arm 47, biased by a spring 48 to tension the belt 42, and around a pair of driving pulley wheels 50 and 52 attached to the bottom portions of the record-belt drive rollers 22 and 24, respectively. (See also Figure 7.) Two side turret plates 53 and 54 (Figure 3) are positioned at opposite ends of the machine respectively between the rollers 18 and 20 and the rollers 22 and 24. These plates are immediately inside the record belt so that any substantial inward displacement of the record will be prevented, thus preventing the record from being torn or ruptured accidentally. These plates normally are not in contact with the record 3 so that they cause no frictional drag. A similar record support plate 55 is positioned along the rear of the endless record path.

The left turret plate 53 forms an integral part of the belt tensioning lever 16. The forward end of this plate or lever 53 is curved slightly inwardly and supported at a pivot 57.

The other end is secured to the supporting structure of the roller 18 so that when the roller 18 is moved from the position shown in full lines in Figure 3 to the release position indicated in broken lines, by means of the lever 16, it moves in an arc around the pivot 57 thus moving the plate 53 away from the surface of the record belt.

A pair of vertical support plates 58 and 59 having outwardly curved end portions are positioned along the forward side of the machine. The space between the flared ends of these plates permits the head 6 to engage the record belt 3 and to move from the bottom to the top of the belt during the recording operation.

Any one of the plates 53, 54, 55, 58, or 59 provides a surface against which the record 3 can be depressed so that the operator can mark with a crayon or pencil on the record, as for identifying the record or giving instructions to the transcriber.

As shown in Figures 1, 4, and 8, a cover plate 60 over the base of the machine has a central, generally rectangular, depression with enlarged rounded corners, as shown in Figure 3, to accommodate the lower portions of the belt supporting rollers. This depression is formed so that the upper surface of the cover plate 60 extends slightly under the lower edge of the record sheet in grazing contact therewith.

In order to make certain that the lower edge of the record belt 3 runs in close contact with flanges formed on the bottom of the record-supporting rollers 18, 20, 22, and 24, the top of each of these rollers is tilted slightly in the direction of record travel. This skewing of the rollers produces a downward component of motion of the part of the surface of each of these rollers in contact with the inside surface of the belt 3 so that the belt is continually urged downwardly by this component of motion as well as by the force of gravity.

The record-reproduce head and drive mechanism

The record-reproduce head 6 is supported by a carriage assembly 61 (Figure 5) that is slidably mounted for vertical movement on a guide rod 62 (see also Figure 10). The carriage 61 is arranged to be driven vertically by a feedscrew 63 which engages a threaded recess 64 in the side of the carriage. In order to disengage the carriage assembly 61 for automatic or manual backspacing, the carriage is rotated around the rod 62 to the position indicated in broken lines in Figure 5 so that the threaded recess 64 does not engage the feedscrew 63.

The engagement of the carriage 61 with the feedscrew 63 is controlled by a flat strip or bail 65 (Figure 5) that extends vertically near the head the full length of the feedscrew 63. This bail 65 is pivoted at top and bottom for rotation about a vertical axis. An upwardly projecting shaft 66 (Figure 4) secured to the end of the bail 65 is pivotally mounted in an upper turret plate 67. At its lower end the bail is pivotally supported by a shaft 68 mounted in a bearing in the base cover plate 60.

One end of this bail 65 slidably engages a pair of lugs 69 and 70 (Figure 5) on the side of the carriage 61 so that as the bail is turned counterclockwise as viewed in Figure 5 the carriage assembly 61 is moved out of engagement with the feedscrew 63.

The upper end of the bail 65 carries a laterally-extending arm 74 (Figures 4 and 9) that is biased by a spring 76 in such direction that the carriage assembly is urged into engagement with the feedscrew 63.

During backspacing, the bail 65 is rotated in a counterclockwise direction as seen in Figure 5 by a cam or finger 86 (Figure 4) projecting upwardly through a hole 88 in the base cover plate 60. This finger 86 is carried by an arm 90 of a bell crank 92 that is pivotally mounted on a horizontal guide rod 94.

When the bell crank is rotated in a counterclockwise direction about the rod 94, the finger 86 moves upwardly behind the bail 65 and by a cam action rotates it in a counterclockwise direction, as seen in Figure 4, to disengage the carriage 61 from the feedscrew 63.

The bell crank 92 can be operated manually to disengage the head-driving mechanism by moving the carriage-control knob 14 downwardly. The knob 14 is connected through a short support 96 (Figure 11) to an arm 98 that is pivotally and slidably mounted on the rod 94. When the knob 14 is moved downwardly to rotate the arm 98 in a counterclockwise direction around the rod 94 as seen in Figure 11, a flexible extension 100 secured to the arm 98 and a leaf spring 102 carried by it are deflected toward the arm 98 by a bail 104 that extends horizontally across the front of the machine under a sloping panel 106. Continued movement of the knob 14 causes the bail 104 to be moved downwardly. The bail 104 is pivotally supported from the horizontal rod 94 as by arms 108 extending upwardly and rearwardly from each end of the bail 104. The bail 104 engages the bell crank 92, as by a depending arm 110 (Figure 4) so that the bell crank revolves with the bail 104 thereby disengaging the carriage assembly 61 from the feedscrew 63.

After the knob 14 is moved downwardly, disengaging the carriage assembly, the head can be moved vertically along the record belt 3 by moving the knob 14 to the right or left along the slot 112 (Figure 11) in the panel 106. This movement is effected by means of a flexible cable 114 which forms a continuous loop extending along the front of the machine just back of the guide rod 94 (Figure 11) and vertically along the left side of the carriage assembly 61 as seen in Figure 3. This cable 114 is secured to a rearward extension 116 (Figure 11) of the arm 98 and along its vertical path to a connecting point 118 (Figure 3) on the carriage assembly 61, the cable passes over two pulley wheels 120 and 122 and under two fixed guide members as indicated at 124 in Figure 6. Thus, the carriage assembly 61 and the structure associated with the knob 14 move in unison whether the carriage position is being adjusted by the knob 14 or the carriage assembly is being driven by means of the feedscrew 63.

As described above, operation of the bail 65 also produces a step-by-step backspacing. The rear of the carriage assembly 61 carries a rigidly secured ratchet arm 128 (Figure 5) on one end of which is mounted a flexible pawl 130 biased downwardly by a spring 132 into engagement with a fixed stop 134.

This clockwise rotary motion of the carriage assembly 61 moves one end of the ratchet arm 128 toward the free edge of the bail 65, and at the same time this edge of the bail 65 moves toward the ratchet arm. As shown in Figure 10 the flexible pawl 130 normally is held above a horizontal position by the fixed stop 134, and as the ratchet arm and the free edge of the bail 65 approach each other, the end of the pawl 130 is caused to bite into a thin strip 136 of resilient material mounted along one edge of the bail 65. As movement continues, the flexible pawl 130 urges the carriage assembly 61 downwardly an increment of distance, for example, as indicated by the broken and full line positions in Figure 10. As the bail 65 is released and is returned to its normal position by the spring 76 (Figure 4), the carriage assembly 61 engages the feedscrew 63 at a slightly lower position.

The automatic backspacing function is produced by a backspace solenoid 137 shown in Figure 6. The armature 138 of this solenoid is connected through a spring link 139 to an extension 140 on the bell crank 92 (Figure 4). When the solenoid 137 is energized, it pulls its armature 138 inwardly, rotating the bell crank 92 in a counterclockwise direction, as seen in Figure 4, similar to the motion produced by depressing the control knob 14 as explained before. The finger cam 86 rotates the bail 65 disengaging the carriage 61 from the feedscrew 63 and incrementally backspacing the carriage.

The carriage assembly 61 is returned automatically to its initial position at the bottom of the feedscrew when the belt-tensioning lever 16 (Figure 1) is moved into its retracted position for the removal of the record 3 by pressing on a handle portion 16b. This pressure pivots this handle inwardly (see Figure 8) about a spring hinge 16c to close a switch 16a (Figure 9) and thus energizes the solenoid 137 to disengage the carriage 61. A bearing roller 141 (Figure 5) is supported by a shaft 142 extending from the rear of the carriage assembly 61. This roller 141 engages a slot 143 (Figure 8) in one end of a carriage-positioning lever 144, which is secured at its other end to the end of a shaft 146 (see also Figure 3) supported by a bracket 148 and which extends into a sleeve bearing 150 held in position by another bracket 152. A crank arm 154 (Figure 8) carrying a roller 156 is fastened to the end of the shaft 146 opposite the lever 144.

The upward motion of the carriage assembly 61 during recording or reproducing lifts one end of the lever 144, rotating the shaft 146 and moving the crank arm 154 and its roller 156 from the initial position represented by the solid line in Figure 8 toward the position shown in broken lines. Whenever the record-tensioning lever 16 is moved to its retracted position, the plate 53 engages the roller 156, thus rotating the lever 144 so as to move the carriage assembly back to its initial position.

In order to indicate that the carriage assembly is approaching the upper end of the guide rod 62, that is, the limit of its travel either during recording or reproducing, a warning bell, generally indicated at 158 in Figure 8, is provided. This warning device includes a bell disk 160, resiliently mounted on the upper turret plate 67, and a clapper 162 pivotally mounted at 163 on a depending bracket 164. To trip the clapper 162, a projection 166 is provided on the lever 144, which strikes a pawl pin 168 on a pawl 170 mounted on the end of the clapper 162. As the lever 144 rises, the clapper 162 is rotated in a counterclockwise direction about its pivot 163, tensioning a clapper spring 172. When the carriage assembly reaches a point near the upper edge of the record, the pin 168 slides off of the projection 166, and the spring 172 causes the clapper 162 to strike the bell 160 warning the operator that the record is nearly used up. During the return motion of the lever 144, the projection 166 is allowed to pass the pin 168 by the pawl 170 which is pivoted on the clapper 162 but normally rests against a stop 174 under the action of the spring 172.

In order to turn off the motor 26 automatically when the carriage 61 reaches the end of its travel, a limit switch 175 (Figure 8) is provided. This switch is operated by a projecting leaf 176 (Figure 3) which is struck by a projection 178 on the lever 144 to open the switch contacts and deenergize the power circuit of the motor 26.

*Apparatus for marking the indicator slip*

The sloping panel 106 (Figure 1) on the front of the base part of the machine carries a transparent plastic window 178 (see also Figure 11) beneath which is placed a paper indicator slip 182. The mechanism shown in Figure 11 permits the operator of the machine to make "correction" or "end of letter" marks or indications on this paper slip for the direction of the person transcribing the dictation.

Single or double marks can be produced by the operator on the indicator slip, for example, to indicate respectively a correction and the end of a letter. When the control knob 14 is moved upwardly, that is in a clockwise direction about the rod 94, it moves the arm 98 and a pointed stylus 184 upwardly so that the stylus punctures the indicator slip 182. A recess, as at 186, is provided along the length of the window 178 to allow the stylus to puncture the paper slip.

Upward movement of the bail 104 moves the flexible extension 100, which carries a stylus 188, and the arm 98 upwardly causing both stylii 184 and 188 to penetrate the slip 182, making a double mark, like a colon, to indicate the end of a letter.

In order to produce this upward motion of the bail 104, a pivotally-supported marking control knob 190, positioned at the right-hand end of the panel 106, is provided with a hooked arm 192 (see Figures 4 and 6) which extends under the extension 140 of the bell crank 92. Rotation of the control knob 190 drives the hooked arm 192 against the rear of the extension 140 pulling the armature 138 (Figure 6) against a fixed stop 194 and stretching the spring 139. Rotation of the bell crank 92 moves the bail 104 (Figure 11) upwardly, thus producing the two perforations forming the end-of-letter mark. The spring 139 returns the bell crank 92 to its normal position.

*Recording-reproducing changeover control apparatus*

In order to change the amplifier and the associated electrical connections from recording to reproducing condition, a switch-operating solenoid, indicated at 196 in Figure 3, is provided with a polarized armature 198 which can be retracted into or pushed out of the solenoid 196. This armature moves a switch arm 200 which is connected to a shaft 202 which passes through the bottom turret plate 68 to a rotary switch 204 (Figure 6). When the thumb button 10 of the hand control unit 12 of Figure 1 is moved upwardly, the solenoid 196 is energized so as to retract the armature, moving the switch arm 200 into the position shown in Figure 3, whereby the machine is placed in recording condition. When button 10 is moved downwardly, the solenoid 196 pushes the armature 198 outwardly, placing the machine in reproducing condition.

Recording loading and phasing control

To maintain correct tracking relationship between the head 6 and the record belt 3 when the record is removed from and replaced on the machine, an automatic phasing mechanism is provided that starts the record belt when the feedscrew 63 is in a certain position.

This is accomplished by locking the belt-tensioning lever 16 in its retracted position and releasing this lever to drive the record belt 3 when the feedscrew 63 is in a predetermined phase relationship with the record 3. A characteristic mark, for instance, a thin vertical red line, may be made extending across the outer surface of the record 3, and when the record is loaded, this mark is aligned with some predetermined part of the machine.

An arm 206 (Figure 6) is fixed to the record-tensioning lever 16 through a hole 208 in the base cover plate 60, so that as the belt-tensioning lever 16 is moved inwardly toward its retracted position, indicated in broken lines in Figure 6, one end of the arm 206 moves outwardly until a detent 210 on the end of a release lever 212 locks in a notch 214 in the end of the arm 206. This detent 210 holds the belt-tensioning lever 16 in its retracted position against the force of a belt-tensioning spring 216. The release lever 212 is mounted on a pivot 218 fixed to the base cover plate 60 and is biased toward its locking position by means of a spring 220.

As shown in Figure 4, the feedscrew 63 is connected by a downwardly-extending shaft 222 to a sprocket 224. This sprocket is driven by a drive gear 226 (Figure 7) which is mounted beneath and driven in synchronism with the belt-drive roller 22.

When the drive motor 26 is energized, the feedscrew sprocket 224 (Figure 6) is rotated until a cam 228, on the sprocket 224, strikes a flange 230 on the release lever 212 moving the detent 210 out of the notch 214, and releasing the belt-tensioning lever 16 to its extended position. The spring 216 now tensions the record belt 3 so that the record 3 commences its scanning motion past the head 6. Since the belt-tensioning lever 16 always is released by the cam 228 when the feedscrew 63 is in the same predetermined angular position, a proper lateral phase relationship between sound tracks on a previously recorded record and the head 6 is obtained.

Auxiliary duplicate recording head

This machine also provides for the use of an additional recording head so that two identical recordings can be made simultaneously on the same belt record. A pair of jacks or sockets 232 (Figure 13) on the upper surface of the recording head 6 are arranged to receive correspondingly spaced contact plugs of an auxiliary head 234. These terminals support the auxiliary head 234 in position on the head 6 and also connect the energizing winding of the auxiliary head in parallel with the winding of the head 6. A U-shaped slot in the auxiliary head 234 receives the guide rod 62 and provides alignment support for the auxiliary head. The two heads are dimensioned so that the distance between their respective pairs of pole pieces is equal to about one-half the width of the record belt 3 so that the two duplicate recordings can cover substantially all of the available recording area.

Record slicing mechanism

When these duplicate records have been made, they can be cut apart by a record slicing mechanism, generally indicated at 236 near the right-hand side of Figure 3, to form two separate records each one-half the width of the original belt record 3. One of these records may be filed as a permanent record and the other mailed or used for other purposes.

This mechanism includes a knife blade 238 supported by a rotatable clamp 240. This clamp 240 is secured to a vertical metal support strip 242 having end shaft extensions pivotally supported in bearing holes in the upper turret plate 67 and in the base cover plate 60. A manually controllable lever 243 (see also Figure 9) secured to the upper shaft end of the strip 242 permits the record-slicing blade 238 to be moved to the position indicated in broken outline in Figure 3 for cutting the record as the record moves around the turret. A flexible leaf spring 244 secured to the vertical side turret plate 54 presses against the rotatable strip 242 to hold the blade 238 normally in its retracted position.

Transcription control unit

In order to control the machine during transcription, a control unit 246 (Figure 2) may be attached to the frame of a typewriter or other support. This unit includes a switch lever 248 for backspacing the machine and a switch lever 250 for starting and stopping the record-driving mechanism. Depressing the "stop" end of the start-stop lever 250, opens the contacts of a motor-control switch 252 (Figure 12) to stop the motor 26, and closes muting switch contacts 258 which are arranged to short circuit the electrical connections to the transcription headphones 256. Depressing the "start" end of this lever energizes the motor 26 and opens the muting switch contacts to permit operation of the earphones.

Pressing the backspace lever 248 closes the contacts 260 to energize the backspace mechanism. In order to stop the record 3 whenever the backspace lever is depressed, the lever 248 is arranged to strike an interlock extension 262 projecting from the end of the stop-start control lever 250 so that downward motion of the backspace lever 248 automatically places the stop-start lever 250 in the stop position. A spring 264 holds the backspace lever up so that the conacts 260 are normally open.

The transcription control unit 246 and the hand microphone 12 are each equipped with a cable and plug which can be plugged into the machine depending upon whether the machine is being used for dictation or transcription.

Electrical circuits

The electrical circuits of the machine are represented diagrammatically in Figure 14. The apparatus is energized by closing a main power or on-off switch 266, by rotation of the knob 8 (see also Figure 1). Two panel lamps 268 and 270, beneath the sloping panel 106, are energized to indicate that the machine is turned on. If the machine is to be used for dictation, a connector 272 from the hand microphone unit 12, is plugged into the machine connecting the terminals A, B, C, D, E, and F to correspondingly lettered terminals on the machine.

When the control button 10 is moved upwardly to condition the machine for recording, a movable contact 274 engages a fixed recording-switch contact 276 connecting terminal C to terminal D and completing a circuit from an alternating current supply main 278 through a half-wave rectifier 280, a portion of the record-reproduce solenoid 196, terminal D, microphone control contacts 276 and 274, terminal C and the common ground circuit to the other supply main 282. The solenoid 196 retracts its polarized armature 198 closing the contacts of the switch 204. A filter condenser 284 is connected between the rectifier 280 and ground to smooth the pulsations of the rectified current.

Closing the switch 204 energizes an indicating lamp 286 through the switch contact 288 denoting that the machine is in recording position. The microphone and soft speaker unit 290 is connected through terminals E and F and switch contacts 292 and 294 to the input of terminals 297 and 298 of an amplifier 300.

One terminal of the recording head 6 is connected through switch contacts 302 and 302a, and relay contacts 304 to the amplifier output terminal 306. The other terminal of the head 6 is connected directly to amplifier output terminal 308 through the common ground circuit.

When the control button 10 is depressed a circuit is completed from the power main 278 through the winding of a motor control relay 310, terminal B, a contact 312, the contact 274, terminal C, and through the common ground circuit to the power main 282. This relay closes its contacts 314 energizing the motor 26 through the limit switch 175.

The contacts 304 of the motor control relay disconnect the head 6 from the amplifier circuits whenever the motor is not running. When the head 6 reaches the end of its scanning path the contacts of the limit switch 175 are opened and the motor 26 is deenergized. A potentiometer controlled by the knob 8 is connected into the amplifier circuits through the switch arm 316 and the contact 317 so that the recording level can be controlled during recording.

When the machine is placed in reproduce condition by moving the button 10 downwardly, a circuit is completed from the power main 278 through the rectifier 280, the reproduce portion of the record-reproduce solenoid 196, terminal A, a reproduce contact 318, movable contact 274, terminal C, and the common ground circuit to the main 282. This causes the solenoid 196 to push its armature 198 to the right and position the switch 204 in the reproduce position. A circuit is also completed for energizing the backspacing solenoid 137 which is connected between the power main 278 and the terminal A.

A loud-speaker 319 now is connected to the output from the amplifier 300 through the switch contact 320, arm 321, arm 322, contact 302, and relay contacts 304. The head 6 is connected to the amplifier input terminals 297 and 298 through a switch arm 323 and a contact 324. The movable switch contact 316 engages a contact 325 so that the volume control is effective to control the loudness of the reproduced sound.

It should be noted that with the record-reproduce switch 204 in reproduce position, the loudspeaker 319 is connected through contacts E and F in parallel with the reversible microphone unit 290. Because the impedance of the microphone is substantially higher than that of the loudspeaker 319, the sound energy is substantially all radiated from the loudspeaker. However, the loudspeaker can be disconnected by means of a manually operable muting switch 326 leaving only the reversible microphone connected to the amplifier.

When it is desired to use the machine for transcribing, the plug 272 is removed from the socket in the machine and a transcriber control plug, indicated diagrammatically at 328, is plugged into the same socket. Depressing the start lever 250 closes the motor switch 252, energizing the motor-control solenoid 310 and starting the motor 26.

To stop the record, the opposite end of the lever 250 is depressed, closing the muting switch contacts 258, short-circuiting the input to the earphones 256 so that no noise is heard by the transcriber as the motor is deenergized. After the muting switch 262 is closed, the motor control switch 252 opens, deenergizing the motor control solenoid 310 thus deenergizing the motor 26, and also opening the relay contacts 304 to disconnect the amplifier output so that it is not overloaded by the short-circuit through the muting switch 262.

To listen back to a portion of the recorded material on the record 3, the backspace lever 248 (Figure 12) is depressed, closing the backspace switch contacts 260 to complete a circuit from the power main 278 through the backspace solenoid 137, terminal A, contacts 260, and through ground to the main 282. The connection of the terminal A to ground also energizes the reproduce portion of the record-reproduce solenoid 196. This solenoid 196 has no effect on the operation of the circuit when the transcribing control unit 246 is plugged into the machine and the machine has already been placed in reproduce condition because there is no connection to the recording condition control terminal D by the plug 328 connected to the transcriber control unit. Thus, the machine is placed in reproduce condition at the commencement of transcription and thereafter the closing of the backspace switch has only the effect of backspacing the head 6.

As explained above, depressing the backspace lever 248 shown in Figure 12, always throws the stop-start lever 250 into stop position by the action of the interlock 262. This has two results, one is that the belt 3 ceases to move during backspacing so that the translating head moves to a corresponding position on a preceding sound track; and the muting switch contacts 258 are closed before the backspacing solenoid 137 or the motor control relay 310 is actuated, and thus the person who is transcribing does not hear noises through the earphone which might otherwise occur by the changes in the connections during backspacing.

What is claimed is:

1. In a sound recording and reproducing machine adapted to utilize a sound record in the form of an endless belt, record-handling apparatus comprising a frame, a plurality of record-supporting rollers rotatably mounted on said frame with their axes substantially parallel, portions of said rollers defining segments of an endless record path, a movable member having record-tensioning and record-releasing positions mounted on said frame, one of said rollers being carried by said member and moved thereby between record-tensioning and record-releasing positions, spring means biasing said member toward said record-tensioning position whereby said one roller tensions said record in said path, a latching mechanism for holding said member in record-releasing position and arranged upon actuation to release said member, a motor coupled to at least one of said rollers for driving said record along said path, and an interlock mechanism controlled by said motor and arranged to release said latching mechanism and cause said roller to tension said record.

2. In a sound recording and reproducing machine adapted to utilize a sound record in the form of an endless belt, record-handling apparatus comprising a frame, a plurality of record-supporting rollers rotatably mounted on said frame with their axes substantially parallel, portions of said rollers defining segments of an endless record path, a movable member having record-tensioning and record-releasing positions mounted on said frame, one of said rollers being a record-tensioning roller and carried by said member and moved thereby between record-tensioning and record-releasing positions, spring means biasing said member toward said record-tensioning position whereby the tensioning roller maintains the record under predetermined tension, a latching mechanism for holding said member in its releasing position and arranged upon actuation to release said member, a recording head positioned adjacent the record path, a drive screw for moving the head across the path, a motor coupled to at least one of said rollers for driving said record along said path and to the drive screw for moving the head, an interlock mechanism controlled by said motor and operated in predetermined synchronized relationship with the feedscrew arranged to actuate said latching mechanism to release said member and move the tensioning-roller into engagement with the record.

3. In a sound recording and reproducing machine adapted to utilize a sound record in the form of an endless belt, record-handling apparatus comprising a frame, four record-supporting rollers including two driving rollers and a record-tensioning roller, means rotatably supporting the rollers on the frame in such manner as to support the belt record, a movable member having record-tensioning and record-releasing positions mounted on the frame and carrying the record-tensioning roller so as to move it into and out of engagement with the belt record, spring means normally biasing the member toward its record-tensioning position, a latch arranged to hold the member in its record-releasing position and arranged upon actuation to release the member, a motor coupled to said driving rollers for driving said record along said path, an interlock mechanism controlled by said motor and arranged to actuate said latch to cause the record-tensioning roller to engage the record and maintain it under substantially constant tension.

4. In a sound recording and reproducing machine for use with a belt-type sound record, a record-supporting and driving mechanism comprising a plurality of rollers including at least one drive roller and one tensioning roller rotatably mounted and supporting said record, a motor mechanically coupled to the drive roller for rotating it in a given direction, a record-drive control member carrying the tensioning roller and movable between record-tensioning and record-releasing positions, spring means biasing the member toward its tensioning position to place the record under tension and force it against the surface of the drive roller, latch means arranged to retain said member in its record-releasing position and upon actuation to release said member, a sound recording-reproducing head, a head-driving mechanism coupled to said motor and engaging said head to move it along a scanning pathway in scanning relationship with said record in said record path, and an interlock mechanism controlled by the head-driving mechanism and arranged to actuate said latch means when said head drive mechanism is in a predetermined position, whereby said member is moved into record-tensioning position when said head is in a predetermined scanning relationship with said record.

5. In a sound recording and reproducing machine for use with a single turn belt record, a record supporting and driving mechanism comprising a plurality of rollers including at least one drive roller and one tensioning roller rotatably mounted and supporting said record, a motor mechanically coupled to the drive roller for rotating it in a given direction, a control member carrying the tensioning roller and movable between record-tensioning and record-releasing positions, a sound recording-reproducing head, a head driving mechanism coupled to said motor and engaging said head to move it along a path in scanning relationship with said record, a first interlock mechanism controlled by the head driving mechanism and arranged to actuate said control member to tension said belt when said head driving mechanism moves into predetermined position, and a second interlock mechanism controlled by said control member to return said sound head to a starting position when said control member moves to record-releasing position whereby automatic indexing of the sound head and record is obtained at the beginning and at the end of operation of said machine.

6. A sound recording and reproducing machine adapted to utilize a relatively wide belt-type record and including means defining a record path, a sound transducing head mounted adjacent said record path and movable along a scanning path generally transversely of said record path, a drive roller for engaging a belt record in said path, drive mechanism for driving a belt record along said path and for moving the head along said scanning path, said drive mechanism being coupled to said drive roller and including feed means for said head engaging said head and moving said head along said scanning path, and a record phasing control means interconnected with said drive mechanism and responsive to a predetermined condition of said drive mechanism for initiating scanning of said head across a record driven along said record path when said drive mechanism is in said predetermined condition, said record phasing control means including a record control member having a record-driving condition and a record-release condition, said control member actuating said drive roller into driving relationship with a record in said path when said control member is in record-driving condition and said control member releasing said drive roller from driving relationship with a record when said control member is in record-releasing condition, and said record phasing control means including an element connected to said head feed means for actuating said control member into record driving condition when said feed means is in a predetermined condition.

7. A sound recording and reproducing machine especially suited for dictation and utilizing a sound record in the form of a wide endless belt having an inner surface adapted for scanning by a transducer recording and reproducing head, said machine comprising a frame housing having a horizontal base and a box-like turret extending upward from said base, record supporting rollers mounted at the corners of said turret to support and rotate said record horizontally around a vertical axis, a transducer head, a feedscrew rotatably mounted within said turret to support said head and move it vertically across the inside surface of said record, a motor mounted within said frame and mechanically coupled to said feed-screw and at least one of said rollers to rotate said record horizontally and simultaneously to scan said head vertically thereacross, a manual control knob extending outward from said frame and mounted for horizontal shifting movement along a line closely adjacent an edge of said record, and linkage means interconnecting said control knob with said transducer head wherein horizontal movement of said control knob imparts vertical movement to said head whereby the operating mechanism for moving said head and driving said rollers is within the general volume defined by said belt record thus reducing the overall size of said machine for a given size record.

References Cited in the file of this patent

UNITED STATES PATENTS

| | | |
|---|---|---|
| 823,022 | Ballance | June 12, 1906 |
| 873,042 | Hagemann | Dec. 10, 1907 |
| 1,127,792 | Mather | Feb. 9, 1915 |
| 2,286,346 | Clausen | June 16, 1942 |
| 2,455,922 | Englander | Dec. 14, 1948 |
| 2,513,441 | Allen | July 4, 1950 |
| 2,554,582 | Mallina | May 29, 1951 |
| 2,577,162 | Smith | Dec. 4, 1951 |
| 2,604,549 | Begun | July 22, 1952 |
| 2,645,494 | Keller | July 14, 1953 |
| 2,647,750 | Camras | Aug. 4, 1953 |
| 2,652,259 | Keller | Sept. 15, 1953 |
| 2,653,819 | Roberts | Sept. 29, 1953 |
| 2,658,398 | Masterson | Nov. 10, 1953 |
| 2,701,718 | Allen | Feb. 8, 1955 |
| 2,702,710 | Conrad | Feb. 22, 1955 |
| 2,730,369 | Steed | Jan. 10, 1956 |

FOREIGN PATENTS

| | | |
|---|---|---|
| 634,675 | Great Britain | Mar. 22, 1950 |
| 675,431 | Great Britain | July 9, 1952 |